Nov. 9, 1965    P. C. TABOR    3,216,766
INFINITE POSITIONAL ADJUSTMENT AND
ONE-WAY LOCK MECHANISM
Filed May 14, 1962    2 Sheets-Sheet 1
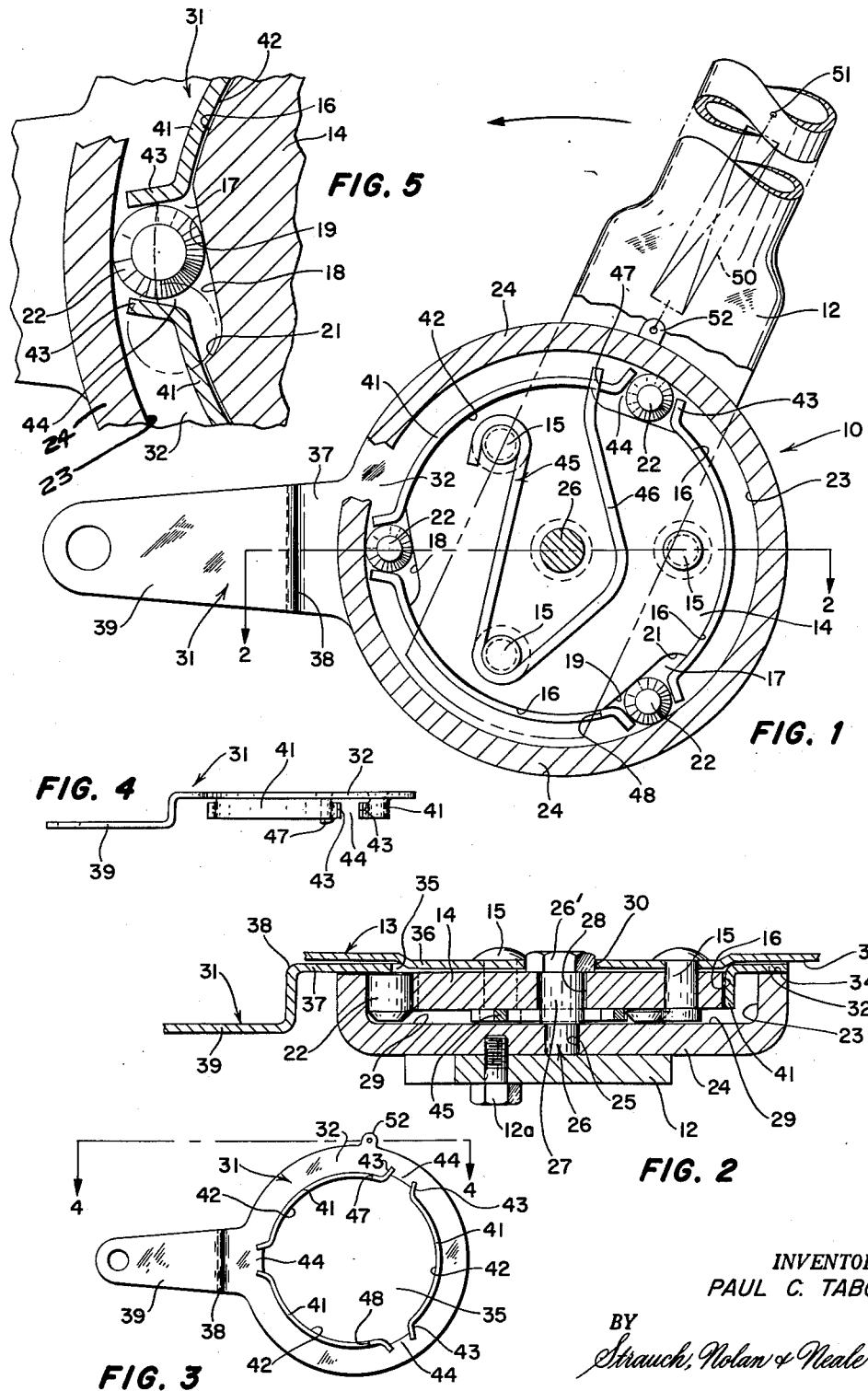
INVENTOR.
PAUL C. TABOR
BY
Strauch, Nolan & Neale
ATTORNEYS Nov. 9, 1965

P. C. TABOR 3,216,766

INFINITE POSITIONAL ADJUSTMENT AND
ONE-WAY LOCK MECHANISM

Filed May 14, 1962

INVENTOR.
PAUL C. TABOR

BY

Strauch, Nolan & Neale

ATTORNEYS

United States Patent Office 3,216,766
Patented Nov. 9, 1965

1

3,216,766
INFINITE POSITIONAL ADJUSTMENT AND ONE-WAY LOCK MECHANISM
Paul C. Tabor, Clawson, Mich., assignor, by mesne assignments, to Rockwell-Standard Corporation, a corporation of Delaware
Filed May 14, 1962, Ser. No. 194,340
8 Claims. (Cl. 297—374)

This invention relates to position adjustment mechanism and more particularly to such mechanisms which are infinitely variable in one or both directions of rotation and which incorporate a self-locking device. In its preferred embodiment the invention has special utility for a seat back tilt adjustment.

Rotatable position adjustment mechanisms are known employing latch and socket means by which the angular position of an automobile seat back may be varied. These mechanisms are usually actuated by means of cables and, although they may be self-locking, they are not infinitely variable, the number of available positions being necessarily limited since only a relatively small number of sockets can be provided in the space available. Furthermore, such mechanism usually incorporate a large number of parts and are therefore expensive and add considerable undesirable weight to the seat assembly.

Other adjusting devices are known which incorporate ratchet and pawl mechanisms. Although in these devices infinite adjustment may be more closely approached, it can not be fully accomplished because of a minimum required tooth width and spacing for effective holding power. A satisfactory working ratchet mechanism which is adjustable in both directions is usually very complicated and expensive and all ratchets are subject to excessive wear due to the load imposed on the ratchet teeth and pawls.

In order to overcome the foregoing disadvantages, the present invention provides a rotatable adjustment assembly which is infinitely variable in both directions of rotation and which is self-locking in any selected adjusted position, and which is of such compact structure that it can be easily incorporated within the usual hinge mechanism of an automobile seat back with which the present invention is primarily concerned, although it is not necessarily limited thereto.

Accordingly, it is the major object of this invention to provide an improved mechanism for positioning a pivoted seat back that may be angularly adjusted in increments of infinitely small angular degrees and which is automatically self-locking in any selected position.

A further object of the invention is to provide a novel positional adjustment between two relatively rotatable members which is capable of infinite angular selection and locking in any selected position.

Another object of the invention is to provide in a rotatable position adjusting mechanism a cam and roller clutching unit which is normally maintained in locked condition by spring means, but which can be easily released to rotate the mechanism to a selected adjusted position and which, upon deactivating the release, locks itself in the selected position.

Still another object of the present invention resides in the provision of a simplified combined positional adjusting and locking mechanism, which requires a minimum of space, is easy to assemble and is resistant to wear.

A further object of the invention is the provision of means to automatically de-activate the lock mechanism of a positional adjustment for a device so that upon rotation of the device in a direction opposite from the selected adjustment direction the device automatically returns to a pre-selected original position.

It is an important object of this invention to provide an

2 infinitely variable positional adjustment between two relatively rotatable members, such as a stationary seat member and a back rest member pivoted thereon, employing a cam and roller unidirectional clutch arrangement normally spring biased to lock said members against relative rotation but which can be released, separately, manually or automatically, by relatively rocking one of the members in a certain direction, to permit relative rotation of said members in either direction to a new relative position, where they may be automatically relocked.

Other objects and novel features will become apparent from the detailed description taken in connection with the appended drawings in which:

FIGURE 1 is a side elevation partially broken away and in section showing the adjusting mechanism according to a preferred embodiment of the invention;

FIGURE 2 is a section along line 2—2 of FIGURE 1;

FIGURE 3 is a side elevation of the release ring apart from the assembly and on a reduced scale;

FIGURE 4 is a top plan view of the release ring of FIGURE 3;

FIGURE 5 is an enlarged fragmentary section at one of the clutch roller, cam and release units of the mechanism of FIGURE 1;

Figures 6, 7:
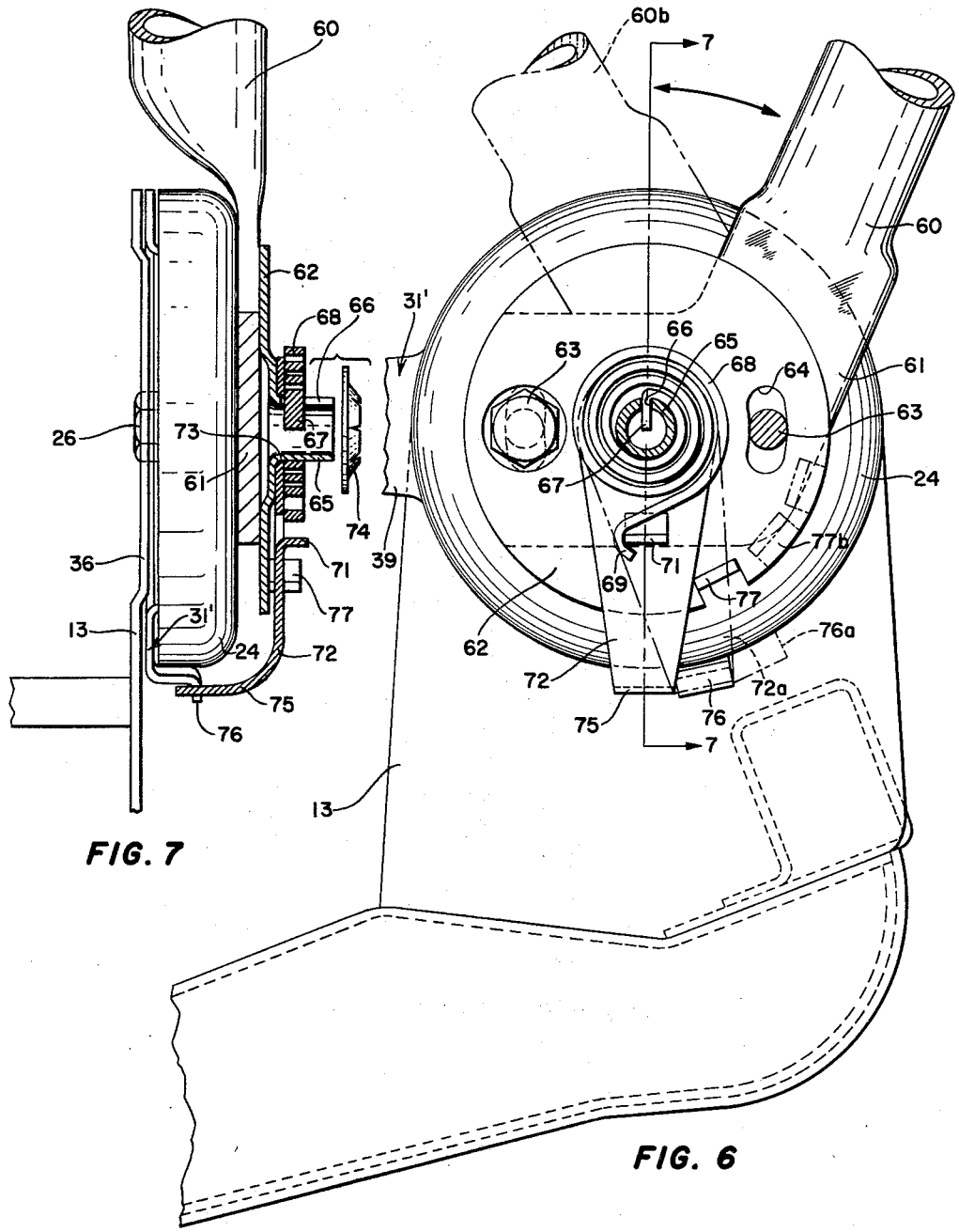
FIGURE 6 is a side elevation partly in section of the pivot assembly of an automobile front seat and reclining back mechanism, embodying the present invention and an improvement that comprises a self-return mechanism to automatically locate the seat back at a prior selected position.
FIGURE 7 is a section along line 7—7 through the mechanism of FIGURE 6.

With reference to FIGURE 1, the adjusting mechanism 10 is disclosed as incorporated in an automobile seat back adjusting mechanism, the lower end of a side rail 12 of the seat back rest frame member being attached to a rotating part of the adjusting mechanism.

A relatively stationary seat frame member 13 (FIGURE 2) has a clutch cam 14 fixed thereupon as by rivets 15. Cam 14 has a circular cylindrical peripheral surface 16 interrupted by a plurality of recesses 17 that are equiangularly spaced. Three recesses 17 are illustrated but any desired number may be used.

At the bottom of each recess 17 is an inclined cam face 18. Cam face 18 has a first straight section 19 that intersects periphery 16 and extends on a chord of the circular arc of periphery 16 and, after about one-half the length of a true chord, merges into a curved section 21 that intersects periphery 16. Thus, with respect to circular periphery 16, each inclined cam face provides a wedge recess 17, and the inclination is in the same direction around the periphery of the cam.

Each recess 17 contains a free cylindrical clutch roller 22 normally having rolling line contact with face 18. The curvature of cam recess section 21 is about the same as that of roller 22.

The outer peripheries of rollers 22 are adapted for rolling line contact with the cylindrical inner surface 23 of a cup-shaped bearing ring 24 which is non-rotatably mounted at 25 upon a pivot bolt 26 that has a cylindrical shank 27 freely rotatably mounted in a central cylindrical bore 28 of cam 14. The enlarged bolt head 26' engages the inner side of fixed cam 14 to prevent axial separation of the cam and bearing ring and thus to retain the rollers, and extends freely through an opening 30 in stationary frame member 13. The beveled flat outer ends of the rollers 22 slidingly abut flat face 29 within ring 24.

Side rail 12 is fixed, as by fasteners 12a, to the closed outer side of bearing ring 24. It will be appreciated that at the other side of the seat (not shown) the opposite side rail 12 is mounted on a free pivot axis coaxial with bolt 26.

Positioning of rollers 22 in the cam recesses 17 is controlled by a combination lock and release ring 31 (FIGURES 3 and 4) which is a sheet metal stamping having an annular flat rim section 32 that in the assembly (FIGURE 2) is rotatably axially trapped between the outer flat surface 33 of stationary seat member 13 and the flat annular inner edge face 34 of bearing ring 24. The circular central opening 35 of rim 32 fits pivotally over a shallow circular extended boss 36 on member 13, and this also holds the ring 31 radially in the assembly.

A radially projecting ring section 37 is bent axially outwardly at 38 (FIGURE 2) and then at right angles outwardly to form a lever handle 39.

Along the edge of opening 35 the metal of ring 31 is bent outwardly to form three equally spaced axially extending flanges 41 of the same circumferential length. The inner peripheries 42 of flanges 41 lie in a cylindrical envelope and extend closely rotatably around the cylindrical cam periphery 16.

The adjacent ends of flanges 41 are curved radially outwardly at 43 to form pockets 44 that freely rotatably circumferentially trap rollers 22 as shown in FIGURES 1 and 5 whereby when ring 31 is rocked about its axis it will bodily displace all rollers 22 similarly along the cam recesses 17. The flat inner ends of rollers 22 slidably abut the flat outer side of rim 32.

A hairpin type spring 45 has one end anchored on a rivet 15 with its U-section extending around a second rivet 15 and terminates in a spring arm 46 abutting a shoulder 47 formed on a ring flange 41, so that spring 45 biases ring 31 clockwise in the assembly in FIGURE 1, thereby urging rollers 22 toward the shallow ends of recesses 17 where they wedge between cam faces 18 and the ring periphery 23. This resiliently clutches the parts together and locks the ring 24 against rotation with respect to cam 14.

Abutment shoulder 48 is provided on another flange 41 for use in an assembly wherein the cam faces are inclined in the other direction.

Thus the side rails 12 are effectively locked in an angular position relative to the horizontal. When it is desired to tip the seat back forward, handle 39 is manually operated to rock ring 31 counterclockwise in FIGURE 1 against the force of spring 45. This shifts all of the rolls 22 into the deeper parts of the cam recesses 17, breaking the friction wedge clutch lock between cam 14 and bearing ring 24, and frees the bearing ring and side rail assembly to tip freely in the direction of the arrow. With the clutch so released, rail 12 can, of course, be rocked in either direction about its pivot at 26.

When the desired new angular relationship of rail 12 has been reached, the operator merely releases lever 39 and the spring 45 then rotatably drives the ring 31 clockwise to displace the rollers 22 into wedge locking position between cam faces 18 and bearing ring periphery 23. The seat back rest is now locked in the selected angularly adjusted position.

In the adjustable seat back structure of the preferred embodiment, a spring 50 is attached to the back rest rail 12 at one end at 51 and to a lip 52 at the other end integral with ring 31. Thus, upon forcible rotation of the back rest by the operator in the direction of the arrow in FIGURE 1, the spring 50 will tension and exert therethrough a pulling force on ring 31 in the counterclockwise release direction, overriding this force of spring 45. Similarly when the back rest is released by the operator, the back rest spring 50 acts to return the back rest to its original position of FIGURE 1 without manual actuation of ring 31.

The ring 31 of course may be actuated manually, mechanically or electrically as preferred and depending on the type of application.

In the foregoing assembly the bearing ring 24 extends to protectively cover the internal cam, roller, spring and associated release and lock elements, and stationary member 13 cooperates to substantially complete enclosure of these parts. The adjustment is silent and certain, there are no teeth to wear and any relative position in either direction about the axis of bolt 26 can be selected and maintained.

It is apparent that the foregoing mechanism may be incorporated in a 360° infinite adjustment between two relatively rotatable members since the release ring will reclutch in any position of rotation of bearing ring 24.

The cam 14, rollers 22, bearing ring 24 and spring biased ring 31 cooperate to provide a one-way clutch mechanism which locks the relatively movable members against relative angular displacement in one direction but freely permits their relative movement in the other direction.

In the assembly, the axes of bolt 26, rollers 22, ring 31 and cam 14 are all parallel and surfaces 23 and 16 are concentric.

FIGURES 6 and 7 illustrate an adjustable automatic release and return mechanism particularly useful in an automotive seat structure to return a pivoted seat back rest to a pre-selected position of adjustment after it has been temporarily displaced therefrom.

In automobile front seat structures, especially in two-door vehicles, the seat backs are usually divided and foldable forwardly to facilitate entry of a passenger into the rear compartment. As above described in connection with FIGURE 1, spring 50 is provided to make folding and return of the back rest to its original position possible without manually operating lever 39.

The embodiment of FIGURES 6 and 7 illustrates an automatic return and lock mechanism to return the back rest to any pre-selected position after the seat back has been folded forwardly. The same person usually drives a certain vehicle all or most of the time. This at least is true with privately owned automobiles. With the back rest adjustment shown in FIGURES 6 and 7, that person can now pre-select and definitely set the back rest in an angular position most comfortable to him. This pre-selected position is always preserved, although the seat back may be temporarily folded, for access to the rear seats, or another person using the vehicle temporarily may set the back rest at a different angle of inclination more suited for him. The pre-selected position can always be regained without difficulty. It will be obvious that such a "memory" device is convenient and of great advantage.

In this embodiment the side rail 60 of the seat back rest, corresponding to rail 12 in FIGURE 1, has its lower end flattened at 61 where it is secured rigidly to the closed outer side of bearing ring 24. A circular plate 62 is rigidly mounted on the rail and bearing ring assembly, as by bolts 63 extending through slots 64 in plate 62. Plate 62 may thus be rigidly secured in a range of relatively rotatably displaced positions with respect to bearing ring 24, for a purpose to appear.

Plate 62 is formed with an axially outwardly projecting hollow hub 65 having a longitudinal slot 66 to anchor one end 67 of a flat coil spring 68 that surrounds hub 65.

The other end 69 of spring 68 is anchored against a tab 71 projecting from a lever 72 apertured at 73 for pivotal mounting on hub 65.

The lower end 75 of lever 72 is bent to project back under the bottom of bearing ring 24, and there it engages a tang 76 which is integral with a clutch release and lock ring 31′ that is otherwise essentially the same as lever 31 in FIGURES 1–5.

Coil spring 68 thus biases lever 72 counterclockwise in FIGURE 6, and since lever 72 abuts projection 76 rigid with ring 31′, it can be seen by reference to FIGURE 1 that spring 68 tends to rock lever 31′ counterclockwise toward clutch release condition. The elements enclosed by bearing ring 24 are the same in FIGURES 6 and 7 as in FIGURES 1–5. However, spring 68 regardless of its power, does not effect such clutch unlocking rotation of ring 31' in the FIGURE 6 condition because lever 72 at the same time now abuts a relatively stationary tang 77 struck out laterally from plate 62.

The FIGURE 6 relative location of the parts may be varied by the adjustment afforded by bolts 63 and slots 64, whereby the angular location of fixed tang 77 may be adjusted to suit the individual.

Now, when the operator pivots the seat back rest forwardly, as to allow a passenger to enter the rear, rail 60 moves counterclockwise from the FIGURE 6 full line position and carries with it the plate 62. As a result, the tang 77 is removed out of the path of lever 72 toward the dotted line positions shown in FIGURE 6. Spring 68 acts as a motion transmitting element between plate 62 and lever 72 to rock lever 72 counterclockwise. This movement of lever 72 continues until release ring tang 76 reaches the position 76a, at which time the ring 31' will have rocked counterclockwise until the rolls 22 are in the curved ends of recesses 17 to stop further counterclockwise rocking of ring 31'.

By this time lever 72 has reached the position 72a, but there is no interference with further counterclockwise pivoting of the back rest rail 60 which, for example, continues to the dotted line position of 60b. At this time tang 77 is at 77b entirely clear of lever 72 which is freely pivoted on hub 65 and therefore merely remains in abutment with the arrested ring tang at 76a.

As the seat back rest rail 60 rocks after rocking of lever 72 has been arrested, the spring 68 will be wound to increasingly spring bias lever 72 into its clutch released position in abutment with tang 76.

Now when the operator wishes to restore the back rest to driving position he pivots rail 60 clockwise. During the first part of this movement spring 68, which is stronger than spring 45, maintains release ring 31' in the clutch released position, but when tang 77 encounters lever 72 at the location 72a it starts to rock lever 72 clockwise away from tang 77. This enables spring 45 to take over and rock the release ring 31' back clockwise until rolls 22 are wedged between recesses 17 and cam ring surface 23 to automatically relock the seat back rest in its original position.

The foregoing is accomplished automatically without manipulation of lever 39 of the release ring 31'. If a different original position of inclination of the back rest is desired, this can be done by manipulating ring 31' manually to select a new automatic locking position as disclosed above in connection with FIGURE 1.

The present invention may be embodied in other specific forms without departing from the spirit and essential characteristics thereof, therefore, the present embodiments being considered in all respects as illustrative only and not restrictive, the scope of the present invention being indicated by the appended claims rather than by the foregoing description.

What is claimed and desired to be secured by Letters Patent is:

1. In an infinitely variable relative angular positional adjustment between automobile seat frame and seat back members that are relatively rotatable about the same axis, an inner clutch part rigid with one of said members and having distributed along its periphery a plurality of roller receiving cam recesses, a plurality of rolling clutch elements disposed in said cam recesses, an outer clutch part rigid with the other member shaped to enclose one side and the periphery of said inner clutch part and having a cylindrical inner periphery surrounding said inner clutch part and enclosing said rolling elements, a rockably mounted combination release and locking ring interposed between said members and comprising pockets in which said rolling elements are disposed, spring means disposed in the space between said one side of the inner clutch part and the outer clutch part and reacting between said inner clutch part and said locking ring for biasing said ring to displace said rolling elements along said recesses circumferentially of said clutch parts to wedge said rolling elements between said clutch parts to lock said members against relative angular movement in one direction, and means for rocking said ring for displacing said rolling elements along said recesses to declutch said members to enable selective relative rotation thereof, said spring means being operative to automatically reclutch said members when said means for displacing said ring is released.

2. In a positional adjustment between an automobile seat back member and a relatively stationary seat frame member on which said back member is pivoted, infinitely variable unidirectional clutch means between said members at the pivotal connection therebetween comprising an inner clutch part rigid with said stationary member and having distributed along its periphery a plurality of inclined roller receiving cam recesses, a plurality of rollers in said recesses, an outer clutch part rigid with said back member and having a cylindrical inner periphery enclosing said inner clutch part and said rollers, a rockable control ring interposed between said clutch parts and having pockets in which said rollers are disposed, spring means biasing said ring to displace said rollers in said recesses to wedgingly lock said clutch parts together, and motion transmitting means operatively connecting said control ring and said back member to actuate said ring to declutch said parts when the back member is tilted forwardly from an initial position.

3. In the positional adjustment defined in claim 2, means for independently manually actuating said control ring to declutch said parts.

4. In a positional adjustment between an automobile seat back member and a relatively stationary seat support member on which said back member is pivoted, infinitely variable unidirectional clutch means between said seat members at the pivotal connection therebetween spring biased into locking condition, a control member movable in opposition to said spring means to disable said clutch means to permit relative rocking of said seat members, said control member when released permitting said spring means to act to automatically reclutch said seat members, means providing an operative motion transmittting connection between said seat back member and said control member whereby pivotal movement of said seat back member in a forward direction will automatically activate said control means to disable said clutch means and comprising a lever pivoted on said back member, means resiilently biasing said lever into operative engagement with said control member, and a stop on said seat back member disposed in engagement with said lever when the seat back is in a selected angular position relative to said support member.

5. In the positional adjustment defined in claim 4, means arresting movement of said control member and said lever after said members have been declutched, and said resilient means permitting continued forward pivotal movement of said seat back after said lever movement has been arrested.

6. In the positional adjustment defined in claim 4, said back member having a hub on which said lever is freely pivoted, said resilient means being a spring anchored at opposite ends on said hub and lever, and said stop being rigid with said hub.

7. In a seat assembly wherein a seat back member is pivoted upon a relatively stationary seat support member, clutch means interconnecting said members at said pivotal connection, a clutch actuator movable between clutch engaged and clutch released positions, means operably connecting said seat back member to said clutch actuator comprising a lever freely pivoted on said seat back and abutting said clutch actuator and spring means interposed between said seat back and said lever for maintaining said abutment and for biasing said lever toward a stop on said seat back, whereby when said seat back member is pivoted forwardly from an initial position said clutch actuator is first automatically moved to clutch release position and there maintained during continued forward pivotal motion of said seat back member, and means energized by forward pivotal movement of said seat back member automatically effective when said seat back member has returned to said initial position to move said clutch actuator to clutch engaged position.

8. In the seat assembly defined in claim 7, means for adjusting said stop to determine said initial position of said seat back member.

References Cited by the Examiner
UNITED STATES PATENTS

| | | | |
|---|---|---|---|
| 1,719,613 | 7/29 | Kohler | 74—156 |
| 1,985,406 | 12/34 | Galkin | 74—156 |
| 2,595,394 | 5/52 | Lauterbach | 297—374 |
| 2,624,396 | 1/53 | Spraragen | 297—374 |
| 2,760,559 | 8/56 | Austin | 297—408 |
| 2,941,583 | 6/60 | Tischler et al. | 297—369 |
| 3,011,606 | 12/61 | Ferris | 192—45 |

FRANK B. SHERRY, *Primary Examiner.*